Nov. 7, 1967  R. E. VON RUDEN  3,350,955
POWER TRANSMISSION MECHANISM FOR ROTARY POWER TOOLS
Filed Nov. 26, 1965  2 Sheets-Sheet 1

INVENTOR.
RAYMOND E. VON RUDEN
BY
*Merchant & Gould*
ATTORNEYS

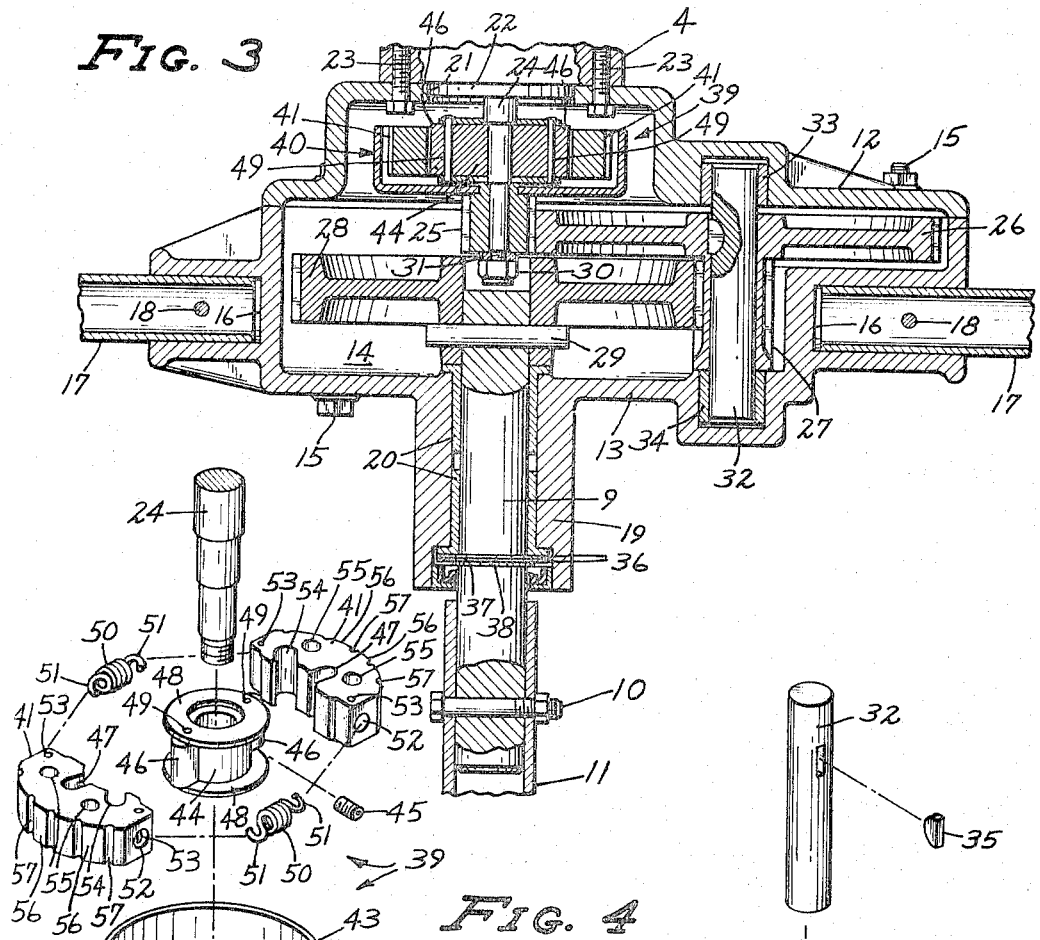
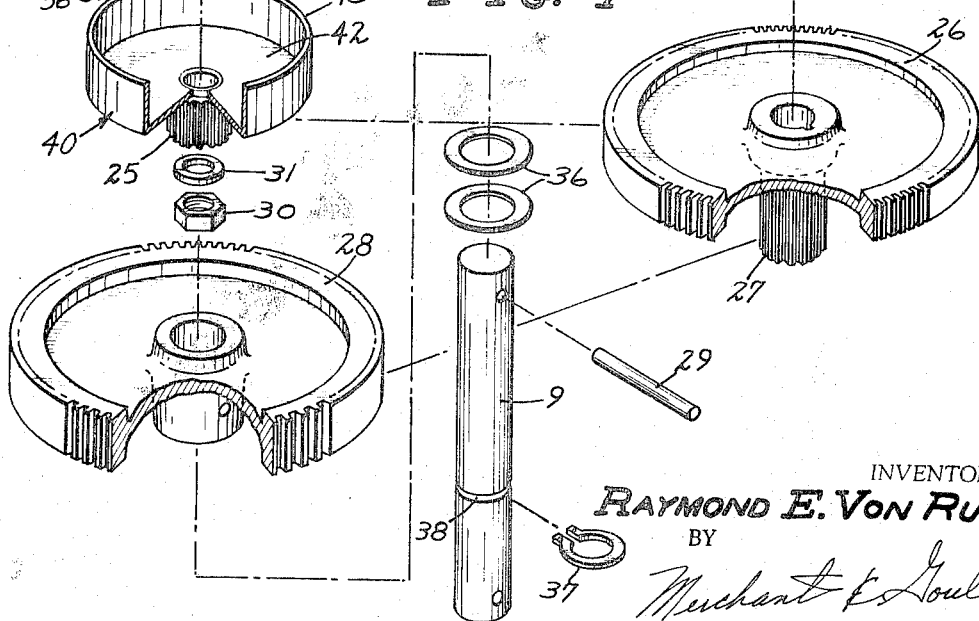

United States Patent Office 3,350,955
Patented Nov. 7, 1967

3,350,955
POWER TRANSMISSION MECHANISM FOR ROTARY POWER TOOLS
Raymond E. Von Ruden, % General Equipment Co.,
P.O. Box 334, Owatonna, Minn. 55060
Filed Nov. 26, 1965, Ser. No. 509,906
4 Claims. (Cl. 74—421)

ABSTRACT OF THE DISCLOSURE

Power transmision mechanism for portable tools, including speed reduction gearing between axially aligned input and output shafts, and centrifugal clutch mechanism between the input shaft and the speed reduction gearing; the clutch mechanism and speed reduction gearing being enclosed in a housing containing liquid lubricant, whereby free access is had for the lubricant to the clutch mechanism as well as to the gearing.

Background of the invention

Heretofore, portable tools having internal combustion engines as prime movers, utilize clutches in the power transmission mechaism thereof, the clutches usually being of the dry type and isolated from the speed reducing gears which are generally confined in a separate chamber containing a supply of liquid lubricant. Clutches of the dry type generate a substantial amount of heat which is detrimental to smooth operation thereof, and causes undue wear. Moreover, to dissipate the heat, these clutches must be often exposed to the surrounding atmosphere which, under many operating conditions, is very dusty, the dust and grit entrained in the air often getting into the clutch mechanism to the rapid deterioration thereof.

Summary of the invention

An important object of this invention is the provision of a transmission mechanism for portable rotary powered tools, which includes clutch mechanism contained within the transmission housing, whereby liquid lubricant in the transmission housing is afforded easy access to the clutch mechanism to automatically lubricate and cool the same. To this end, I provide a housing comprising a pair of cooperating housing sections defining a chamber, an input shaft journalled for rotation in the chamber, a centrifugal clutch operatively mounted on said input shaft within the chamber, an output shaft journalled in the housing on an axis aligned with the axis of the input shaft, and speed-reduction gearing in the chamber and operatively connected to the clutch and the output shaft. The clutch includes driving and driven portions operatively connected to the input shaft and the speed reduction gearing respectively, the driving portion comprising a pair of diametrically opposed shoes operatively connected to the input shaft to be rotated thereby, the shoes being independently radially movable toward and away from the driven portion and having yielding means urging said shoes radially inwardly away from engagement with said driven portion of the clutch. The above, and still further highly important objects and advantages of this invention will become apparent from the following detailed specification, appended claims and attached drawings.

Description of the drawings

Referring to the drawings, which illustrate the invention, and in which like reference characters indicate like parts throughout the several views:

FIG. 3 is a fragmentray vertical section, taken substantially on the line 3—3 of FIG. 2; and FIG. 4 is an exploded view in perspective of the moving parts, some portions being broken away, and some portions being shown in section.

Detailed description

Figure 1:
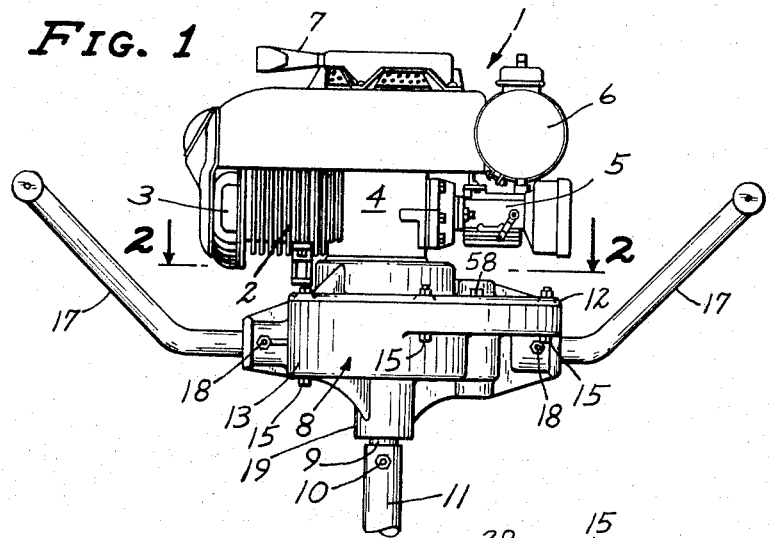
FIG. 1 is a fragmentary view in side elevation of a rotary power operated tool incorporating the power transmission mechanism of this invention.

Referring with greater detail to the drawings, a conventional portable internal combustion engine 1 is shown as comprising an engine block 2, a cylinder head 3, a crankcase portion 4, a carburetor 5, a fuel tank 6, and a starting handle 7. In FIG. 1, the engine 1 is shown as being disposed in overlying relationship to a transmission housing, indicated in its entirety by the reference character 8, the transmission mechanism within the housing 8 including an output shaft 9 to which is bolted, as indicated at 10, the tubular shank 11 of a rotary tool or chuck, not shown. The tool to which the shank 11 is operatively connected may be any of one of a number of rotary tools, such as post-hole or ice augers, drill bits for use in wood or metal or other similar rotary tool bits or blades. These various tool bits or similar device do not, in and of themselves, comprise the instant invention. Hence, for the sake of brevity, detailed showing and description thereof is omitted.

The transmission housing 8 comprises upper and lower housing sections 12 and 13 which cooperate to define a chamber 14, the housing sections 12 and 13 being rigidly secured together by nut-equipped bolts or the like 15. The lower housing section 13 defines a pair of opposed recesses 16 for reception of the inner ends of a pair of opposed handle members 17 by means of which the tool may be guided or carried. The inner ends of the handle 17 are rigidly secured in their respective recesses 16 by nut-equipped bolts or the like 18. The lower housing section 13 further comprises a depending hollow boss 19 in which is mounted a pair of sleeve bearings 20 which journal the output shaft 9. The upper housing section 12 is formed to provide an opening 21 that is axially aligned with the output shaft 9, and which receives a bearing end portion 22 of the crankcase 4, the crankcase 4 being rigidly secured to the upper housing section 12 by machine screws or the like 23, see FIG. 3. As further shown in FIG. 3, the drive shaft 24 of the engine 1, hereinafter to be referred to as the input shaft 24, projects downwardly into the chamber 14 in axial alignment with the output shaft 9, terminating just above the upper end of the output shaft 9.

Speed reducing power transmission mechanism within the chamber 14 comprises, a rotary power-transfer element in the nature of a pinion 25, a gear 26 having meshing engagement with the pinion 25, a second pinion 27 preferably integrally formed with the gear 26, and an output gear 28 having meshing engagement with the second pinion 27 and rigidly secured to the upper end portion of the output shaft 9 by means of a transverse pin or the like 29. The pinion 25 is journalled on the lower end portion of the input shaft 24, the lower end of the input shaft 24 being screw threaded to receive a holding nut 30 between which and the pinion 25 is disposed a bearing washer or the like 31. The integrally formed gear 26 and pinion 27 are keyed to a jackshaft 32 that is journalled at its opposite ends in bearings 33 and 34 mounted in the upper and lower housing sections 12 and 13 respectively on an axis parallel to the common axis of the input and output shafts 24 and 9 respectively. As shown in FIGS. 3 and 4, the gear 26 and pinion 27 are keyed to the jackshaft 32 by a conventional Woodruff key or the like 35.

The output shaft 9 and output gear 28 are held against axial movement relative to the housing 8 by engagement of the hub portion of the gear 28 with the upper end of the uppermost one of the sleeve bearings 20, and one of a pair of spacing washers 36 that engages the lower end of the lowermost sleeve bearing 20, the washers 36 being releasably locked in place on the shaft 9 by a split locking ring 37 mounted in an annular groove 38 in the output shaft 9, see FIGS. 3 and 4.

Rotation of the input shaft 24 is imparted to the rotary transfer element or pinion 25 by clutch means 39 disposed within the chamber 14 and comprising, an annular driven clutch portion or drum 40 and a cooperating rotary driving clutch portion comprising a pair of diametrically opposed drive shoes or the like 41. The drum 40 comprises a flat disk-like body portion 42 and a cylindrical flange 43 concentric with the axis of the input shaft 24, the body portion 42 having a central opening which receives the upper end portion of the pinion 25, the drum 40 being rigidly secured to the pinion 25 by welding, brazing or the like. The shoes 41 are mounted for radial movements toward and away from operative engagement with the radially inner surface of the drum flange 43, on a rotary drive element 44 that is rigidly mounted on the input shaft 24, for common rotation therewith, and locked thereon by a set screw or the like 45. The drive element 44 is formed to provide a pair of radially projecting drive lugs 46 that are radially slidably received in radially inwardly opening channels or recesses 47 in the shoes 41. Axial movement of the shoes 41 relative to the drive element 44 is limited by a pair of annular stop plates 48 that are mounted on the upper and lower ends of the drive element 44 and locked in place by pins or rivets 49.

Figure 2:
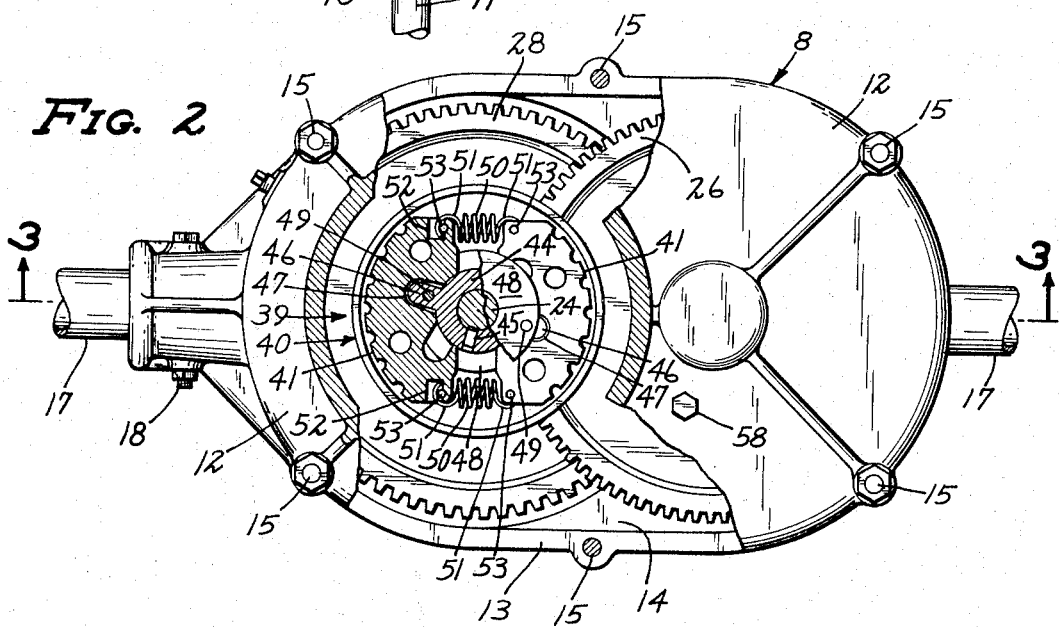
FIG. 2 is an enlarged fragmentary view partly in plan and partly in section, taken on the line 2—2 of FIG. 1, with some parts being broken away.

The clutch shoes 41 are yieldingly urged in a radially inward direction toward the drive element 44 by a pair of coil tension springs 50 having hooked ends 51 that are received in recesses 52 in opposite ends of each of the shoes 41, and hooked over pins 53 that extend transversely through the openings 52, see particularly FIG. 2. As therein shown, the springs 50 are disposed at diametrically opposite sides of the drive element 44. Further, the shoes 41 are each formed with recesses 54 and holes 55 for balance. The shoes 41 are formed to provide radially outer arcuate surfaces 56 that are adapted to engage the radially inner surface of the drum flange 43, the surfaces 56 having flutes or grooves 57 therein for a purpose which will hereinafter become apparent.

Liquid lubricant, such as conventional lubricating oil, not shown, is introduced into the chamber 14 through a filler opening, not shown, in the upper housing section 12, the filler opening being normally closed by a usual filler cap or plug, indicated at 58 in FIGS. 1 and 2. During operation of the tool, the lubricant, not shown, in the chamber 14 becomes sufficiently agitated to completely bathe all of the parts of the clutch means 39, including the radially inner surface of the drum flange 43 and the arcuate surfaces 56 of the shoes 41. When the engine 1 is inoperative, or running at idle speeds, the springs 50 hold the shoes 41 at their radially innermost positions in engagement with the drive element 44. When the engine 1 is caused to accelerate beyond a predetermined speed, the shoes 41, which rotate in common with the drive element 44 and input shaft 24, are caused to move radially outwardly under centrifugal action against bias of the springs 50 into engagement of the arcuate surfaces 56 thereof with the radially inner surface of the drum flange 43. Pressure of the shoes 41 against the radially inner surface of the drum flange 43 causes lubricant therebetween to be squeezed into the grooves or flutes 57, whereby to increase the frictional engagement between the shoes 41 and the drum flange 43 to a point where the drum 40 is caused to rotate in common with the input shaft 24, thus applying rotation to the output shaft 9 and the tool carried thereby. Because of the lubricant with which the drum is constantly supplied from the supply in the chamber 14, the clutching action between the driving and driven portions of the clutch means 39 is very smooth and, as the grooves or flutes 57 collect oil which is wiped from the faces 56 and the inner surface of the drum flange 43 during initial engagement of the flange surface by the shoes 41, slippage therebetween is reduced to a minimum.

By enclosing the clutch means 39 within the closed chamber 14, and running the clutch means 39 in a substantially constant bath of oil, foreign matter, such as dust and grit, is excluded from the clutch means 39, thus assuring smooth, predictable performance of the clutch mechanism and long life to the parts thereof. The lubricant further acts as a coolant to the clutch parts so that, during repeated engagement and disengagement of the clutch, the heat generated thereby is effectively dissipated from the clutch, whereby to assure uniformity of clutching operation over extended periods of operating time. Further, due to the fact that the clutching surfaces of the drum flange 43 and shoes 41 are coated with a thin film of lubricant even when fully engaged, slippage will occur between the shoes 41 and the drum flange 43 under excessive load conditions. Such excessive load conditions are those as might occur when the present invention is used in a portable hand-held earth boring tool or auger. With such tools, shock loads are often produced by impact of the boring tool with a rock or other obstruction, causing the tool to decelerate to a point where the clutch will slip, thus protecting not only the working parts, but also the operator from such shock loads. Moreover, by mounting the clutch means 39 directly on the engine or input shaft 24, within the transmission housing 8, a rotary tool can be produced which is very compact, with a minimum of working parts and substantial savings in weight and material. Portable tools using dry-type clutches disposed outwardly of the transmission housing, require an additional shaft to the transmission housing with the necessary additional bearings and sealing means, thus incurring additional expense in the production of such tools.

This invention has been thoroughly tested and found to be completely satisfactory for the accomplishment of the objectives set forth; and, while I have shown and described a commercial embodiment of my power transmission mechanism, it will be understood that the same is capable of modification without departure from the spirit and scope of the invention, as defined in the claims.

What is claimed is:

1. Power transmission mechanism for rotary power tools comprising:
   (a) a housing defining a gear and lubricant chamber,
   (b) an input shaft journalled for rotation in said chamber,
   (c) a rotary drive element mounted on the input shaft for common rotation therewith in said chamber,
   (d) a rotary power transfer element journalled on said input shaft within said chamber in axially spaced relation to said rotary drive element,
   (e) centrifugal clutch means in said chamber and having cooperating clutch portions operatively connected to said drive element and said power transfer element and disposed to be bathed by lubricant in said chamber,
   (f) an output shaft journalled in said housing on an axis extending in a direction axially of said input shaft, and
   (g) speed reduction mechanism in said chamber and operatively connecting said power transfer element with said output shaft.

2. The power transmision mechanism defined in claim 1 in which said clutch portions comprise:
   (a) an annular driven clutch portion mounted on said transfer element concentric therewith and for common rotation therewith,
   (b) a cooperating rotary driving clutch portion operatively connected to said drive element for common rotation therewith and having a surface portion movable toward and away from driving engagement with said annular clutch element, (c) and yielding means urging said driving clutch portion in a direction to move said surface portion away from driving engagement with said annular element, (d) said driving clutch portion being responsive to rotation of said input shaft at predetermined speeds to move said surface portion toward engagement with said annular element against bias of said yielding means.

3. The power transmission mechanism defined in claim 1 in which said rotary power transfer element comprises a pinion, said output shaft being axially aligned with said input shaft, and in which said speed reduction mechanism comprises a jackshaft mounted in said housing in spaced parallel relation to said input and output shafts, an output gear fixed on said output shaft, and a pair of speed reducing gears mounted for common rotation on said jackshaft, said speed reducing gears having meshing engagement with respective ones of said pinion and output gear.

4. The power transmission mechanism defined in claim 1 in which said housing comprises upper and lower housing sections removably secured together and cooperating to define said chamber, characterized by a motor secured to said upper section and including said input shaft, said upper housing section having an opening through which said input shaft extends downwardly into said chamber, said motor being disposed to close said opening.

References Cited
UNITED STATES PATENTS

| | | | |
|---|---|---|---|
| 1,988,338 | 1/1935 | Schmitter et al. | 74—421 |
| 2,218,893 | 10/1940 | Schlesinger | 74—421 |
| 2,221,315 | 11/1940 | Okun | 74—421 |
| 2,250,981 | 7/1941 | Abel | 74—421 X |
| 2,588,229 | 3/1952 | Geesink | 74—421 |
| 2,759,368 | 8/1956 | Kitto. | |
| 2,942,711 | 6/1960 | Zindler | 192—105 |
| 3,026,665 | 3/1962 | Hoff | 192—105 X |
| 3,039,577 | 6/1962 | Dahlman et al. | 192—105 |
| 3,295,648 | 1/1967 | Foutch et al. | 192—105 |

DONLEY J. STOCKING, *Primary Examiner.*

L. H. GERIN, *Assistant Examiner.*